Figure 1:
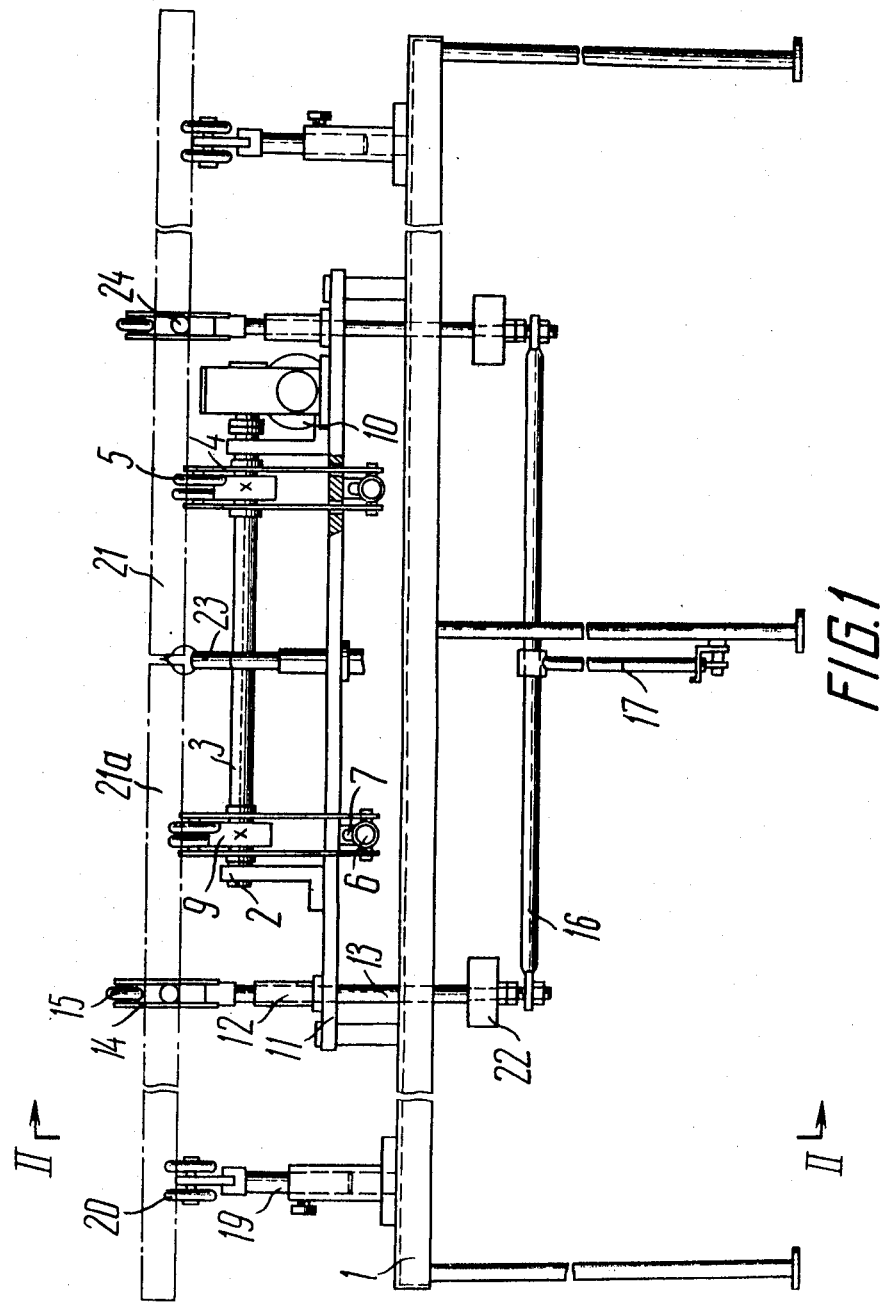

United States Patent

[11] 3,619,158

[72] Inventors: Albert Musagitovich Akhunov, ulitsa Gogolya, 53, kv. 8, Bugulma; Rafkhat Maxutov, ulitsa Tukaeva, 75a, kv. 35, Bugulma; Yakov Fedorovich Gubarev, ulitsa Gogolya, 51, kv. 8, Bugulma; Mansur Abdullovich Zalyaliev, ulitsa Shevchenko, 53, kv. 43, Bugulma; Ilgiz Mullayanovich Sabirov, ulitsa Petrovskaya, 10, kv. 5, Bugulma; Khalida Khatimovna Imamutdinova, ulitsa Kuibysheva, 32, kv. 15, Leninogorsk, all of U.S.S.R.
[21] Appl. No. 21,752
[22] Filed Mar. 23, 1970
[45] Patented Nov. 9, 1971
[32] Priority Mar. 31, 1969
[33] U.S.S.R.
[31] 1,321,697

[54] APPARATUS FOR WELDING GLASS RODS, PARTICULARLY TUBULAR GLASS RODS
3 Claims, 2 Drawing Figs.

[52] U.S. Cl. .................................................. 65/152, 65/36, 65/272, 269/43, 269/156
[51] Int. Cl. ............................................................. C03b 29/04
[50] Field of Search ................................................ 65/152, 56, 36, 271, 272; 269/43, 156; 228/4, 44

[56] References Cited
UNITED STATES PATENTS

| | | | |
|---|---|---|---|
| 2,228,010 | 1/1941 | Koenig | 65/272 |
| 2,368,169 | 1/1945 | Smith | 65/272 |
| 2,735,230 | 2/1956 | Morrill, Jr. | 65/152 X |
| 3,113,012 | 12/1963 | Smith | 65/152 |
| 3,186,819 | 6/1965 | Thorington et al. | 65/271 X |
| 3,324,275 | 6/1967 | Peignen | 228/4 X |

Primary Examiner—Arthur D. Kellogg
Attorney—Holman and Stern

ABSTRACT: An apparatus for welding glass rods, particularly, glass rods of a hollow tubular shape, wherein the operation of reciprocating the rods being welded longitudinally, simultaneously with their rotation about the longitudinal axes thereof, is mechanized.

APPARATUS FOR WELDING GLASS RODS, PARTICULARLY TUBULAR GLASS RODS

The present invention relates to apparatus for joining glass rods, particularly, tubular hollow glass rods, by welding; it can be used in the operation of joining glass rods which are subsequently used for glazing metal pipes, such as those employed in the crude oil industry.

It is commonly known fact that metal pipes employed in the crude oil industry are mostly 8 meters to 12 meters long. Tubular glass rods, however, which are used for glazing such pipes are usually available in a 2.0 m. to 2.5 m. range of lengths. Tubular rods of such length are readily transportable, whereas transportation of tubular rods five or six meters long requires the use of particular types of specialized vehicles as well as specialized containers and devices.

In addition, the transportation of lengthy tubular glass rods involves a comparatively high loss of tubes on account of breakage. All this leads to increased cost of operation.

Up until now welding of comparatively short tubular glass rods into rods of a desired length has been carried out with the help of devices wherein the rods to the welded are placed upon a plurality of spaced support rollers, whereafter the welding operation is effected by means of a gas burner mounting intermediate of the support rollers.

In these known devices rotation of the rods being welded, as well as their reciprocation, i.e., driving the rods longitudinally together and spreading them apart at the respective appropriate stages of the welding operation, are performed manually.

This fact constitutes the major disadvantage of the known devices, since manual operation reduces the efficiency of the devices and affects the quality of the welds obtained.

The quality of the welded joints is particularly poor, when the above-specified known devices are used for joining a pair of tubular rods of different, however slightly, diameters, since these known devices feature no provisions for centering, or axial aligning of the rod lengths being welded.

Besides, practical manual operation of these known devices is labor-consuming and complicated.

On the other hand, there are known devices for gas-cutting of glass rods and tubes which include a system of driven support rollers upon which a rod or tube to be cut is placed, and at least a pair of pressure, or weight rollers oppositely inclined with respect to the longitudinal axis of the rod or tube, whereby in the course of rotation of the rod or tube these oppositely inclined pressure rollers tend to expand or stretch the rod longitudinally therebetween (see, for example, the U.S.S.R. Pat. No. 123,296, Cl. 32 a, 33/06). These devices, however, are intended exclusively for the operation of cutting glass rods or tubes, where the rod or tube being operated upon is expanded longitudinally to break in the area where it is heated by the flame of a gas burner or torch. Devices of this kind cannot be practically applied for welding tubular glass rods, since they incorporate no means for reversing the direction of the longitudinal effort applied to the rods being welded, which is essential for the welding operation.

It is an object of the present invention to eliminate the above-mentioned disadvantages of the known devices.

The present invention has for its aim the provision of an apparatus in which the pressure rollers arranged so as to effect longitudinal reciprocation of a pair of glass rods of which the adjacent end portions are welded together, which reciprocation is necessary for the welding operation.

This aim is attained in an apparatus for welding glass rods, particularly, tubular hollow glass rods, wherein a pair of glass rods being welded is supported between a plurality of driven support rollers and at least a pair of pressure idler rollers, in which apparatus, in accordance with the present invention, said pressure rollers are mounted by means affording positive selective rotation of said rollers about their respective vertical central axes, the means support the pressure rollers including a pair of brackets carried by bars mounted for positive vertical reciprocation.

An apparatus of the above specified structure provides for rapid reversing at a desired moment of the direction of the longitudinal displacement of the pair of rods being welded, without interrupting their rotation.

In order to effect automatically the operation of removal of the welded rod from the support rollers, each one of said brackets has a portion thereof with an outwardly sloping top surface, said top surface being positioned at such vertical level that when said bracket is driven into its topmost position, said sloping surface is raised above the support rollers.

In order to provide for aligning of the longitudinal axes of the glass rods being welded, in cases when the diameters of the pairs of rods to be welded differ, each said rod support roller is carried by the end portion of one of a plurality of arms extending in a vertical plane, the arms being interconnected in pairs by means of pivot pins, said pivot pins being mounted on the framework of said apparatus and pivotally supporting said pairs of said arms in the points thereof intermediate of the opposite ends of said arms, the ends of the two arms of each said pair of arms, opposite to said ends thereof carrying said support rollers, being interconnected by means of an associated adjustment screw, each said adjustment screw having a portion with a left-hand helical thread threadingly engaging one of said opposite ends of said pair of arms and a portion with a right-hand thread threadingly engaging the other one of said opposite ends of said pair of arms, each said adjustment screw being vertically adjustably mounted on said framework.

Figure 2:
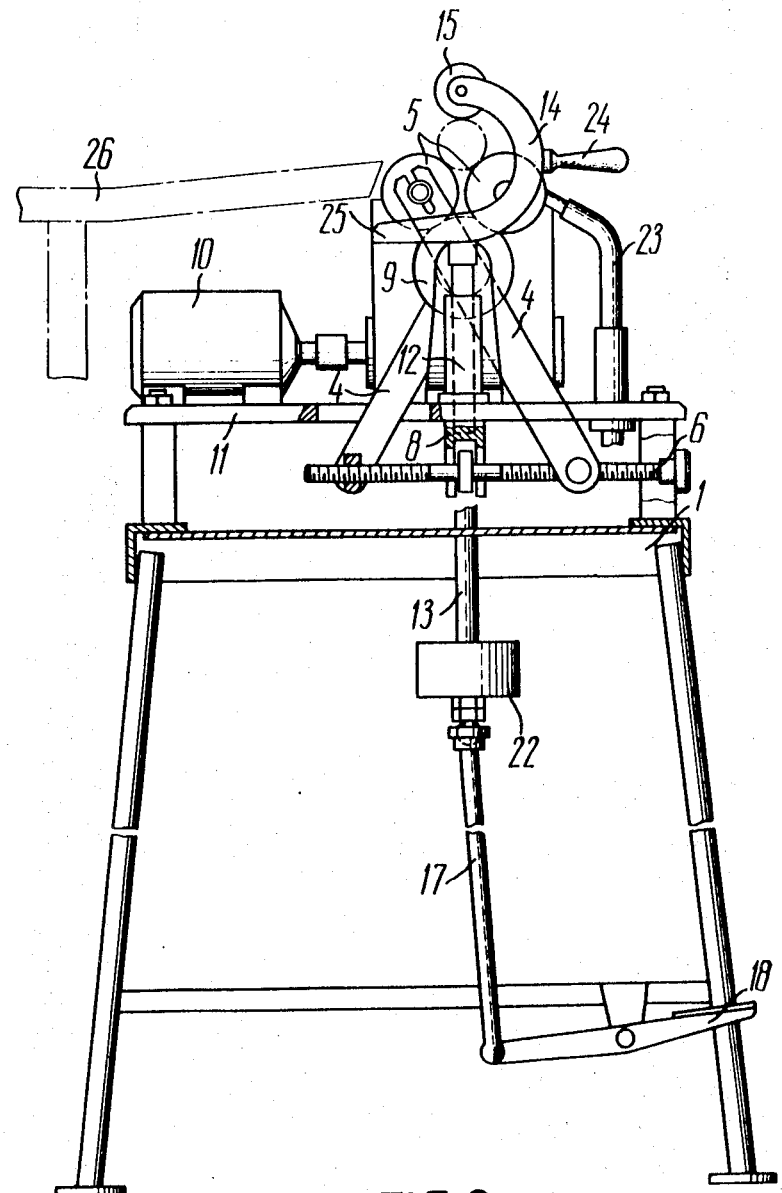

The present invention will be better understood from the following detailed description of an embodiment thereof, with due reference being had to the accompanying drawings, wherein:

FIG. 1 is a side elevational view showing schematically an apparatus for joining tubular glass rods by welding, constructed accordance with the present invention; and FIG. 2 is a cross-sectional view taken along line II—II of FIG. 1.

Referring now in particular to the appended drawings, the apparatus for welding glass rods, constructed in accordance with the present invention, comprises a framework 1 (FIGS. 1 and 2) having mounted thereon a pair of upright supports 2 (FIG 1) in the respective upper end portions of which there is journaled for rotation a spindle 3 (FIG. 1) which also serves as a pivot axis about which two pairs of arm 4 (FIGS. 1 and 2) can be pivotally adjusted. The upper ends of the respective pairs of arms 4 each carry a driven rotatable support roller 5.

The lower ends of each pair of arms 4 are connected by an adjustment screw 6 having a left-hand thread portion and a right-hand thread portion, the screw 6 being rotatably mounted and vertically slidable in the slot 7 (FIG. 1) of the respective one of a pair of brackets 8 FIG. 2. The guide rollers 5 can be frictionally driven by their respective centrally located drive rollers 9 (FIGS. 1 and 2) which are rigidly secured to the rotatable spindle 3 for rotation therewith. The spindle 3, in its turn, can be rotatably driven by a drive means such as by an electric motor 10. The support plate 11 of the framework 1 has secured thereto a pair of generally vertically disposed hollow guide sleeves 12 slidably receiving there inside the respective ones of a pair of vertically reciprocable bars 13, each bar 13 carrying in the upper portion thereof a curved bracket 14. Each of the curved brackets 14 has rotatably mounted thereon, adjacent its upped end, a pressure roller 15. The lower end of each bar 13 is connected to a common horizontal bar 16 (FIG. 1) which is pivotally connected to a lever 17 (FIGS. 1 and 2) actuated by a pivotable treadle 18. The vertical bars 13 are rotatably journaled in the respective end portions of the bar 16, whereby the bars 13 can be rotatably adjusted about their respective longitudinal axes.

The framework 1 has mounted thereon a pair of vertically adjustable supports 19 carrying on the upper end portions thereof rotatable idler support rollers 20.

The herein disclosed apparatus operates as follows. When the treadle 18 is depressed by the operator's foot, the pressure rollers 15 are raised sufficiently for a pair of glass rods 21 and 21a (FIG. 1) to be placed onto the respective adjacent driven guide rollers 5 and idler support rollers 20. The vertical position of the rollers 20 should be adjusted beforehand to correspond to the diameter of the rods 21 and 21a to be welded. After the glass rods have been placed onto the support rollers 5 and 20, in case the rods 21 and 21a differ slightly in their diameters, the rods are centered radially i.e. their respective axes are aligned, by means of the adjustment screws 6. When the screw 6 is rotated either clockwise or counterclockwise, the respective arms 4 are, correspondingly, either spread apart or brought closer together by their rotation about their pivot axis defined by spindle 3. Consequently, the driven support rollers 5 carried by the respective arms 4 are likewise spread apart from each other or brought closer together. In this way the rods 21 and 21a are centered relative to each other. Then the treadle 18 is released by the operator, and the weights 22 (FIGS. 1 and 2) mounted on the respective bars 13 lower the rods with the brackets 14 into their bottom positions, whereby the glass rods 21 and 21a are urged by the pressure rollers 15 downwardly, into firm engagement with the support rollers 5 and 20. Then the motor 10 is energized to drive the spindle and the drive rollers 9 carried thereby into rotation; the rollers 9 transmit their rotation through the driven support rollers 5 to the glass rods 21 and 21a. The gas burner 23 is then ignited, the burner being supported by the plate 11 by means affording vertical adjustment thereof relative to the rods 21 and 21a being welded.

Thus the welding operation is started. The operator takes the handles 24 secured to the respective brackets 14 in his hands and either spreads the brackets longitudinally or brings them closer together, depending on the direction of the rotation of the drive support rollers 5, together with the pressure rollers 15 carried by the brackets (by moving the brackets 14 in this manner the operator turns the respective bars 13 and, consequently, the rollers 15 about their respective vertical axes). This applies an axial force to each of the glass rods to drive the adjacent ends of the glass rods 21 and 21a toward each other, for these ends to abut each other and to be welded together.

In order to prevent formation of a bulging weld seam in the welded joint, the handles 24 are operated in a direction opposite to that in which they have been operated to drive the adjacent ends of the rods 21 and 21a together, whereby the rollers 15 are rotated about their vertical axes to drive the rods 21 and 21a apart, and the welded joint is rapidly expanded, while the joint are is still plastic. Then the treadle 18 is again depressed to raise the curved brackets 14 with the rollers 15 carried thereby into their top position. The lower portion 25 (FIG. 2) of each one of the curved brackets 14 has an outwardly sloping top surface which, when the bracket 14 is raised into the top position, rises above the support rollers 5 and 20, whereby the glass rod, 21, 21a, now welded into an integral unit, are raised clear off the rollers 5, 20 and roll down the sloping top surface of the portions 25 of the brackets 14 onto a delivery table 26.

Then the above-described operating cycle can be repeated.

What we claim is:

1. An apparatus for welding glass rods, particularly, tubular hollow glass rods, comprising: a framework; a plurality of driven support rollers rotatably carried by said framework, said support rollers being adapted to support thereon in axially aligned relationship at least a pair of glass rods to be welded; at least two substantially vertically extending bars; means mounting said bars on said framework for vertical reciprocation of said bars relative to said framework; actuating means for effecting vertical reciprocation of said bars relative to said framework; bracket means carried by each of one of said bars; pressure rollers carried by said bracket means, adapted to engage the upper portion of each of said rods to be welded, each said pressure roller being selectively angularly rotatable about the central vertical axis thereof relative to said framework; and means for effecting positive angular rotation of said pressure rollers to impart an axial force to each of said glass rods.

2. An apparatus, as claimed in claim 1, wherein each said bracket means has a portion thereof with an outwardly sloping top surface, each said bracket means being vertically reciprocable with its respective bar between a topmost position and a lowermost position, said sloping top surface of said portion of each said bracket means being raised, when said bracket means is in its topmost position, above said support rollers.

3. An apparatus, as claimed in claim 1, wherein each said support rollers is carried by the end portion of the respective one of a plurality of arms extending in a substantially vertical plane, said arms being interconnected in pairs by means of pivot pins, said pivot pins being mounted on said framework of said apparatus and pivotally supporting the respective pairs of said arms intermediate of the ends of said arms, the two ends of said arms of each said pair of arms, opposite to said ends thereof carrying said support rollers, being interconnected by an adjustment screw having one portion with a left-hand thread threadingly engaging one of said two opposite ends and another portion with a right-hand thread threadingly engaging the other one of said two opposite ends.

* * * * *